United States Patent
Otsubo

(10) Patent No.: US 11,402,654 B2
(45) Date of Patent: Aug. 2, 2022

(54) METHOD FOR MANUFACTURING STEREOSCOPIC IMAGE FORMING DEVICE, AND STEREOSCOPIC IMAGE FORMING DEVICE

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 378 days.

(21) Appl. No.: 16/617,865

(22) PCT Filed: Sep. 15, 2017

(86) PCT No.: PCT/JP2017/033531
§ 371 (c)(1),
(2) Date: Nov. 27, 2019

(87) PCT Pub. No.: WO2018/220876
PCT Pub. Date: Dec. 6, 2018

(65) Prior Publication Data
US 2020/0158926 A1 May 21, 2020

(30) Foreign Application Priority Data
Jun. 1, 2017 (JP) ............................ JP2017-109195

(51) Int. Cl.
*G02B 30/00* (2020.01)
*G02B 30/60* (2020.01)
(Continued)

(52) U.S. Cl.
CPC ........ *G02B 30/00* (2020.01); *B29D 11/00596* (2013.01); *B32B 27/08* (2013.01);
(Continued)

(58) Field of Classification Search
CPC ........ G02B 30/60; G02B 30/00; G02B 30/35; G02B 30/34; G02B 30/36; G02B 5/0808;
(Continued)

(56) References Cited

U.S. PATENT DOCUMENTS

| 8,638,511 B2 | 1/2014 | Maekawa et al. |
| 2003/0058555 A1 | 3/2003 | Takino |

(Continued)

FOREIGN PATENT DOCUMENTS

| CN | 104520747 A | 4/2015 |
| CN | 110476106 A | 11/2019 |

(Continued)

OTHER PUBLICATIONS

Office Action dated Dec. 7, 2021, issued in counterpart JP application No. 2019-219631, with English Translation. (8 pages).

(Continued)

*Primary Examiner* — Jade R Chwasz
(74) *Attorney, Agent, or Firm* — WHDA, LLP

(57) ABSTRACT

A method for manufacturing a stereoscopic image forming device includes a process of molding, from a first transparent resin, molding base materials 22 each including inclined surfaces 17 and vertical surfaces 18 on one side of a transparent plate member 16, a process of manufacturing a pair of intermediate base materials 28 by forming mirror surfaces on the vertical surfaces 18 of the respective molding base materials 22, and a process of manufacturing first and second optical control panels 13 and 14 integrated together by making the pair of intermediate base materials 28 face each other so that their vertical surfaces 18 are orthogonal to each other in a plan view, and joining together the intermediate base materials by filling the grooves 19

(Continued)

with a second transparent resin with a lower melting point than and a refractive index equal or approximate to the first transparent resin.

5 Claims, 9 Drawing Sheets

(51) Int. Cl.
*B29D 11/00* (2006.01)
*B32B 27/08* (2006.01)
*G02B 1/04* (2006.01)
*G02B 5/09* (2006.01)

(52) U.S. Cl.
CPC ................ *G02B 1/04* (2013.01); *G02B 5/09* (2013.01); *G02B 30/60* (2020.01)

(58) Field of Classification Search
CPC .......... G02B 5/124; G02B 5/122; G02B 5/12; G02B 5/136; G02B 5/085; G02B 5/0858
USPC ........................................................ 359/462
See application file for complete search history.

(56) References Cited

U.S. PATENT DOCUMENTS

| | | |
|---|---|---|
| 2012/0300310 A1 | 11/2012 | Maekawa et al. |
| 2015/0212335 A1 | 7/2015 | Shimatani |
| 2015/0336340 A1 | 11/2015 | Otsubo |
| 2016/0167353 A1 | 6/2016 | Fan et al. |
| 2017/0146705 A1 | 5/2017 | Otsubo |
| 2018/0039050 A1* | 2/2018 | Rose .................... H04N 13/218 |
| 2018/0267216 A1 | 9/2018 | Otsubo |

FOREIGN PATENT DOCUMENTS

| | | | |
|---|---|---|---|
| JP | H10-197704 A | 7/1998 | |
| JP | 2006-184678 A | 7/2006 | |
| JP | 4196676 B2 | 12/2008 | |
| JP | 2011-090117 A | 5/2011 | |
| JP | 2012-247459 A | 12/2012 | |
| JP | 2014-066825 A | 4/2014 | |
| JP | 2016-151685 A | 8/2016 | |
| JP | 2017-026734 A | 2/2017 | |
| JP | 2017-072681 A | 4/2017 | |
| JP | 6203978 B1 | 9/2017 | |
| JP | 6203978 B1 * | 9/2017 | ............... G02B 5/08 |
| WO | 2009131128 A1 | 10/2009 | |
| WO | 2014/024677 A1 | 2/2014 | |
| WO | 2015033645 A1 | 3/2015 | |
| WO | 2017/051598 A1 | 3/2017 | |
| WO | WO-2018138932 A1 * | 8/2018 | ............. B29C 43/00 |

OTHER PUBLICATIONS

Decision to Grant a Patent dated Jan. 25, 2022, issued in counterpart JP application No. 2019-219631, with English translation. (5 pages).
Grant of Patent dated Feb. 16, 2022, issued in counterpart KR application No. 10-2019-7036471, with English Translation. (4 pages).
Office Action dated Aug. 12, 2021, issued in counterpart KR Application No. 10-2019-7036471, with machine translation. (8 pages).
Office Action dated Sep. 14, 2021, issued in counterpart JP Application No. 2019-219631, with machine translation. (7 pages).
Office Action dated Feb. 1, 2021, issued in counterpart KR Application No. 10-2019-7036471, with English Translation. (11 pages).
Extended (Supplementary) European Search report dated Feb. 8, 2021, issued in counterpart EP Application No. 17 91 1574.6. (6 pages).
Office Action dated Mar. 22, 2021, issued in counterpart CN Application No. 201780091313.4, with English Translation. (17 pages).
International Search Report dated Dec. 5, 2017, issued in counterpart International Application No. PCT/JP2017/033531, with English translation (1 page).

* cited by examiner

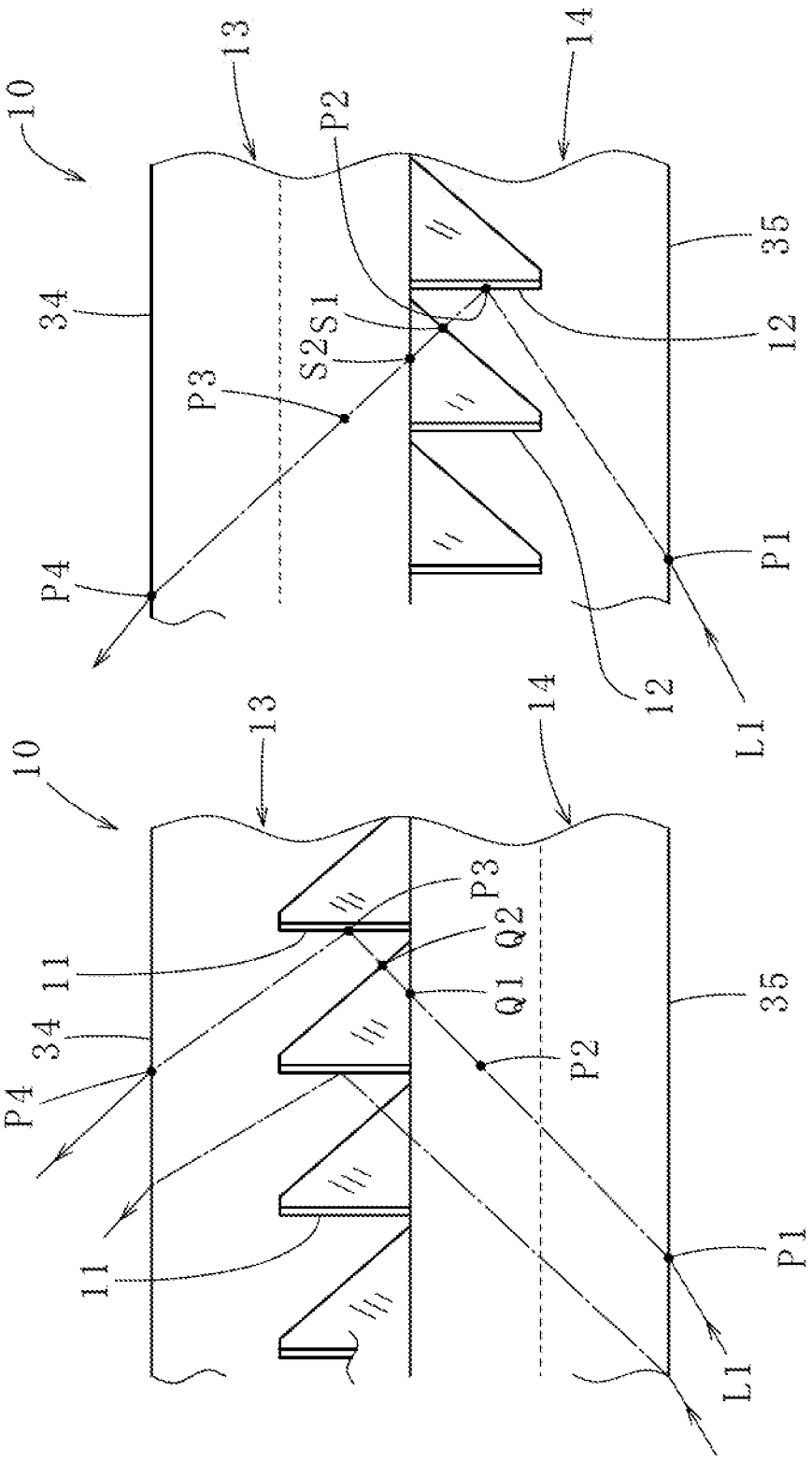

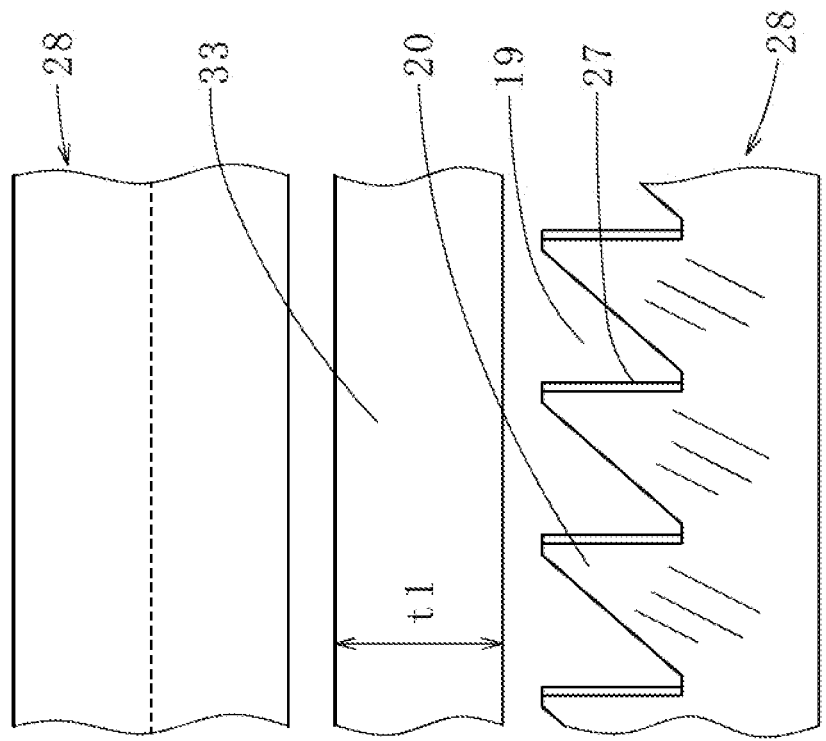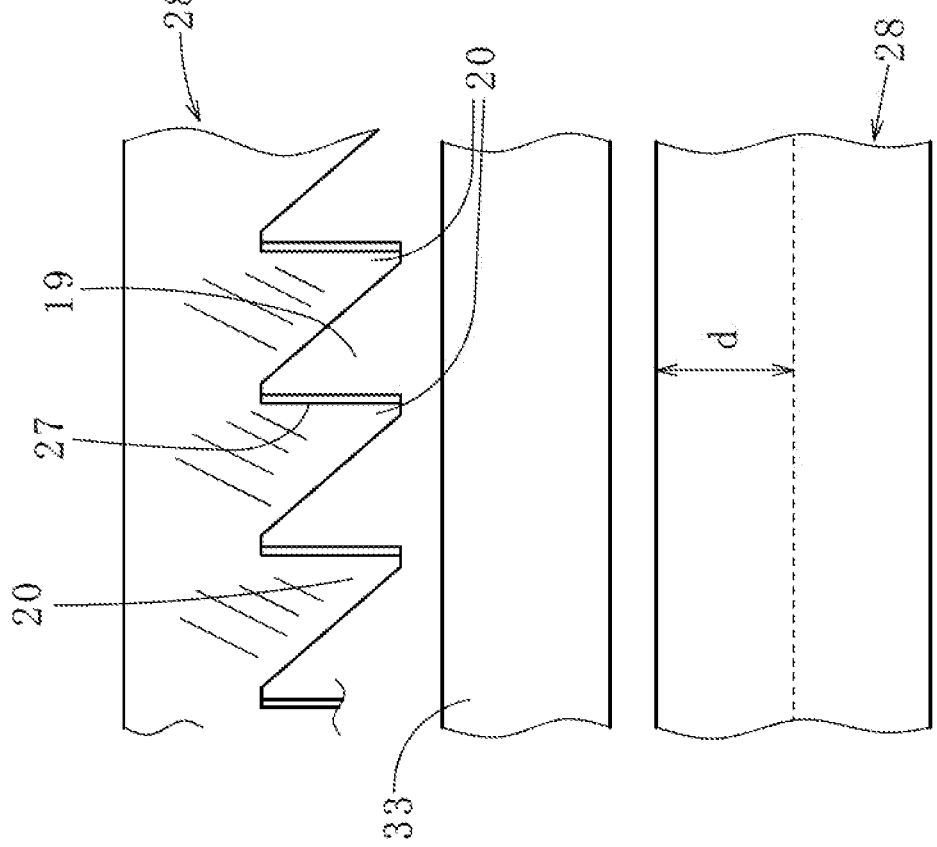

METHOD FOR MANUFACTURING STEREOSCOPIC IMAGE FORMING DEVICE, AND STEREOSCOPIC IMAGE FORMING DEVICE

TECHNICAL FIELD

The present invention relates to a method for manufacturing a stereoscopic image forming device to be formed by superposing (or integrating) first and second optical control panels (or first and second optical control portions) with or without a space between the panels, each including band-shaped light reflecting surfaces (mirror surfaces) arranged parallel to each other in a state where the light reflecting surfaces of the panels are orthogonal to each other in a plan view, and the stereoscopic image forming device.

BACKGROUND ART

As a device to form a stereoscopic image by using light (scattered light) emitted from an object surface, for example, there is a stereoscopic image forming device (optical image forming device) described in Patent Literature 1.

This image forming device is configured by including first and second optical control panels formed by arranging, at constant pitches, large numbers of band-shaped light reflecting surfaces disposed vertically in thickness directions of two transparent flat plates and formed of metal reflecting surfaces (mirror surfaces) inside the transparent flat plates, and closely joining together one surface sides of the first and second optical control panels facing each other so that the respective light reflecting surfaces of the first and second optical control panels become orthogonal to each other in a plan view.

CITATION LIST

Patent Literatures

Patent Literature 1: International Publication No. 2009/131128
Patent Literature 2: International Publication No. 2015/033645

SUMMARY OF INVENTION

Technical Problem

When manufacturing the above-described first and second optical control panels, a lamination body is fabricated by laminating a large number of plate-shaped transparent synthetic resin plates or glass plates (hereinafter, referred to as "transparent plates" as well) with a constant thickness each having a metal reflecting surface formed on one surface side so that the metal reflecting surfaces are disposed on one side, and the panels are cut out from this lamination body so that cut-out surfaces perpendicular to the respective metal reflecting surfaces are formed.

Therefore, the work for forming the metal reflecting surfaces on the transparent plates requires a large-scale deposition furnace, and in addition, work for putting one or a few transparent plates into a deposition furnace, creating a high vacuum by deaeration, then applying vapor deposition to the plates, exposing the plates to an atmospheric pressure and taking the plates out, requires repeating a hundred times or more, and this is very troublesome work that takes time. Moreover, it is necessary to perform work for forming a lamination body by laminating the metal-deposited transparent plates and cut out first and second optical control panels from the lamination body by cutting the lamination body at very thin predetermined thicknesses, and perform work such as polishing the cut-out surfaces (both surfaces) of these first and second optical control panels, and this results in poor workability and poor manufacturing efficiency.

Further, Patent Literature 1 additionally describes that an optical image forming device is provided by making first and second optical control panels having grooves right triangular in section from a transparent resin, and closely joining together the first and second optical control panels by setting the panels to face each other so that their reflecting surfaces are orthogonal to each other, however, since total reflection is used as the reflecting surfaces, there has been a problem that it is difficult to obtain a bright image because the aspect ratio of the grooves is small.

As described in Patent Literature 2, a method is proposed in which two optical control panels each including an uneven plate member each having grooves quadrangular in section formed in a surface by parallel banks, and light reflecting portions formed on opposite parallel side surfaces of the grooves are prepared, and these two optical control panels are set to face each other in a state where their light reflecting portions are orthogonal to or interact each other.

However, there has been a problem that at the time of injection molding, if the heights of the banks of the uneven plate member are set to be high (that is, the grooves are made deep), demolding is extremely difficult. Further, there has been a problem that it is difficult to uniformly mirror-finish only the side surfaces of the parallel grooves, and the products vary considerably.

The present invention was made in view of these circumstances, and an object thereof is to provide a method for manufacturing a stereoscopic image forming device and a stereoscopic image forming device, enabling comparatively easy manufacturing and capable of obtaining a bright and clear stereoscopic image.

Solution to Problem

A method for manufacturing a stereoscopic image forming device according to a first aspect of the present invention appropriate for the object is a method for manufacturing a stereoscopic image forming device in which first and second optical control panels each including a large number of band-shaped light reflecting surfaces disposed parallel to each other with spaces in standing states are set so that the band-shaped light reflecting surfaces of the first and second optical control panels are orthogonal to each other in a plan view, and superposed, including:

a first process of manufacturing, by any one of press molding, injection molding, and roll molding, from a first transparent resin, molding base materials of the first and second optical control panels in each of which a large number of grooves triangular in section each having an inclined surface and a vertical surface, and a large number of ridges triangular in section formed by the grooves adjacent to each other, are disposed parallel to each other on one side of a transparent plate member;

a second process of manufacturing intermediate base materials of the first and second optical control panels by selectively forming mirror surfaces only on the vertical surfaces of the grooves of each of the molding base materials; and a third process of joining and integrating together the intermediate base materials by heating and pressing by flat surfaces disposed parallel to each other while a sheet made of a second transparent resin with a lower melting point than a lower melting point of the first transparent resin and a refractive index equal or approximate to a refractive index of the first transparent resin is sandwiched between the intermediate base materials in a state where the intermediate base materials are made to face each other so that the vertical surfaces of the grooves are orthogonal to each other in a plan view, and filling the molten second transparent resin in the grooves, wherein the inclined surfaces of the grooves of the respective molding base materials manufactured in the first process are formed of a) flat surfaces or b) concave surfaces, uneven surfaces, or polygonal surfaces recessed from the flat surfaces.

Here, the refractive index $\eta 2$ of the second transparent resin is preferably in a range of 0.8 to 1.2 times (more preferably, 0.9 to 1.1 times, still more preferably, 0.96 to 1.04 times) as large as the refractive index $\eta 1$ of the first transparent resin (the same applies to second and third aspects of the present invention as well).

As the second transparent resin, one formed in a sheet shape is used. This sheet is sandwiched between intermediate base materials of the first and second optical control panels, and the intermediate base materials sandwiching the sheet are pressurized (pressed) and heated by flat presses having flat surfaces opposite each other in a vacuum state, and accordingly, the second transparent resin is molten and the second transparent resin is filled in the grooves to join the intermediate base materials together. As a result, a stereoscopic image forming device including the first and second optical control panels integrated together is obtained. At this time, when the depth of the grooves is d, a thickness t1 of the sheet of the second transparent resin is preferably t1>d (more specifically, 2d>t1>d). On pressing surfaces of the flat presses, flat metal sheets such as stainless steel plates, titanium plates, copper plates, etc., are preferably disposed. Accordingly, heat conduction and pressing forces are made uniform, and the resin material surfaces are flattened.

A method for manufacturing a stereoscopic image forming device according to a second aspect of the present invention appropriate for the object is a method for manufacturing a stereoscopic image forming device in which first and second optical control panels each including a large number of band-shaped light reflecting surfaces disposed parallel to each other with spaces in standing states are set so that the band-shaped light reflecting surfaces of the first and second optical control panels are orthogonal to each other in a plan view, and superposed and joined together, wherein the first and second optical control panels are respectively manufactured by:

a first process of manufacturing, by any one of press molding, injection molding, or roll molding from a first transparent resin, molding base materials of the first and second optical control panels in each of which a large number of grooves triangular in section each having an inclined surface and a vertical surface, and a large number of ridges triangular in section formed by the grooves adjacent to each other, are respectively formed parallel to each other on one side of a transparent plate member;

a second process of forming intermediate base materials of the first sand second optical control panels by selectively forming mirror surfaces only on the vertical surfaces of the grooves of the respective molding base materials; and a third process of heating and pressing a sheet made of a second transparent resin with a lower melting point than a lower melting point of the first transparent resin and a refractive index equal or approximate to a refractive index of the first transparent resin by flat surfaces disposed parallel to each other, and filling the second transparent resin in the grooves of each of the intermediate base materials, wherein the inclined surfaces of the grooves of the respective molding base materials manufactured in the first process are formed of a) flat surfaces or b) concave surfaces, uneven surfaces, or polygonal surfaces recessed from the flat surfaces.

Here, a sheet-shaped second transparent resin is covered on the groove side of each of the intermediate base materials, and the second transparent resin is molten and the second transparent resin is filled in the grooves by being pressurized and heated using flat presses in a vacuum state, and accordingly, first and second optical control panels are obtained. At this time, when the depth of the grooves is d, a thickness t1 of the sheet of the second transparent resin is preferably 2×t1>d (more specifically, 2d>2×t1>d).

The first and second optical control panels are superposed and joined together so that the vertical surfaces of the grooves of the respective intermediate base materials are orthogonal to each other in a plan view. For this joining, a third transparent resin with a refractive index equal or approximate to a refractive index of the first and second transparent resins, or a transparent adhesive agent with a refractive index equal or approximate to a refractive index of the first and second transparent resins is preferably used. A transparent ultraviolet-curing resin may be used.

In the methods for manufacturing a stereoscopic image forming device according to the first and second aspects of the present invention, it is preferable that horizontal surfaces are formed between lower ends of the inclined surfaces and lower ends of the vertical surfaces of the grooves of the respective molding base materials.

In the methods for manufacturing a stereoscopic image forming device according to the first and second aspects of the present invention, it is preferable that the selective formation of mirror surfaces on the vertical surfaces of the grooves in the second process is performed by sputtering, metal deposition, spraying of metal microparticles, or irradiation of ion beams onto the vertical surfaces from diagonal directions so that the inclined surfaces of the grooves are hidden behind the ridges.

A method for manufacturing a stereoscopic image forming device according to a third aspect of the present invention appropriate for the object is a method for manufacturing a stereoscopic image forming device in which first and second optical control portions each including a large number of band-shaped light reflecting surfaces disposed parallel to each other with spaces in standing states are disposed so that the band-shaped light reflecting surfaces of the first and second optical control portions are orthogonal to each other in a plan view, including:

a first process of manufacturing, by press molding, injection molding, or roll molding, a molding base material made of a first transparent resin in which large numbers of first and second grooves triangular in section each having an inclined surface and a vertical surface, and large numbers of first and second ridges triangular in section formed by the first and second grooves adjacent to each other, are respectively formed on both sides of a transparent plate member, and the vertical surfaces of the first and second grooves formed on both sides of the transparent plate member are disposed to be orthogonal to each other in a plan view;

a second process of forming an intermediate base material by selectively forming mirror surfaces only on the vertical surfaces of the first and second grooves on both sides of the molding base material; and a third process of forming first and second optical control portions by filling the first and second grooves of the intermediate base material with a second transparent resin with a lower melting point than a lower melting point of the first transparent resin and a refractive index equal or approximate to a refractive index of the first transparent resin, wherein the inclined surfaces of the grooves of each of the molding base materials manufactured in the first process are formed of a) flat surfaces or b) concave surfaces, uneven surfaces, or polygonal surfaces recessed from the flat surfaces, and the second transparent resin to be used in the third process has a sheet shape, and is molten and filled in the first and second grooves by being heated and pressed.

Here, by covering the sheet-shaped second transparent resin on the front and back surfaces (grooves) of the intermediate base material, and pressurizing and heating them using flat presses in a vacuum state, the second transparent resin is molten and the molten second transparent resin is filled in the first and second grooves, and accordingly, a stereoscopic image forming device including first and second optical control portions integrally formed on the front and back surfaces of one transparent plate member can be obtained. At this time, when a depth of the grooves is d, a thickness t1 of the sheet of the second transparent resin is 2×t1>d (more specifically, 2d>2×t1>d) as in the second aspect of the present invention.

In the method for manufacturing a stereoscopic image forming device according to the third aspect of the present invention, it is preferable that horizontal surfaces are formed between lower ends of the vertical surfaces and lower ends of the inclined surfaces of the first and second grooves of the molding base material.

In the method for manufacturing a stereoscopic image forming device according to the third aspect of the present invention, it is preferable that the selective formation of mirror surfaces on the vertical surfaces of the first and second grooves in the second process is performed by sputtering, metal deposition, spraying of metal microparticles, or irradiation of ion beams onto the vertical surfaces from diagonal directions so that the inclined surfaces of the first and second grooves are hidden behind the first and second ridges.

A stereoscopic image forming device according to a fourth aspect of the present invention appropriate for the object is a stereoscopic image forming device in which first and second optical control panels each including a large number of band-shaped light reflecting surfaces disposed parallel to each other with spaces in standing states are set so that the band-shaped light reflecting surfaces of the first and second optical control panels are orthogonal to each other in a plan view, and superposed and joined together, wherein each of the first and second optical control panels includes a large number of grooves triangular in section disposed parallel to each other on one side of a transparent plate member formed of a first transparent resin, and each having an inclined surface and a vertical surface, a large number of ridges triangular in section formed by the grooves adjacent to each other, and mirror surfaces formed on the vertical surfaces of the grooves, the first and second optical control panels are disposed to face each other so that the vertical surfaces of the grooves are orthogonal to each other in a plan view, and joined and integrated together by a second transparent resin having a refractive index equal or approximate to a refractive index of the first transparent resin and filled in the grooves, and the inclined surfaces of the grooves are formed of a) flat surfaces or b) concave surfaces, uneven surfaces, or polygonal surfaces recessed from the flat surfaces.

A stereoscopic image forming device according to a fifth aspect of the present invention appropriate for the object is a stereoscopic image forming device in which first and second optical control panels each including a large number of band-shaped light reflecting surfaces disposed parallel to each other with spaces in standing states are set so that the band-shaped light reflecting surfaces of the first and second optical control panels are orthogonal to each other in a plan view, and superposed, wherein each of the first and second optical control panels includes a large number of grooves triangular in section disposed parallel to each other on one side of a transparent plate member formed of a first transparent resin, and each having an inclined surface and a vertical surface, a large number of ridges triangular in section formed by the grooves adjacent to each other, mirror surfaces formed on the vertical surfaces of the grooves, and a second transparent resin having a refractive index equal or approximate to a refractive index of the first transparent resin and filled in the grooves, and the first and second control panels are superposed and joined together so that the vertical surfaces of the grooves are orthogonal to each other in a plan view, and the inclined surfaces of the grooves are formed of a) flat surfaces or b) concave surfaces, uneven surfaces, or polygonal surfaces recessed from the flat surfaces.

A stereoscopic image forming device according to a sixth aspect of the present invention appropriate for the object is a stereoscopic image forming device in which first and second optical control portions each including a large number of band-shaped light reflecting surfaces disposed parallel to each other with spaces in standing states are disposed so that the band-shaped light reflecting surfaces of the first and second optical control portions are orthogonal to each other in a plan view, wherein the first optical control portion includes a large number of first grooves triangular in section disposed parallel to each other on one side of a transparent plate member formed of a first transparent resin, and each having an inclined surface and a vertical surface, a large number of first ridges triangular in section formed by the first grooves adjacent to each other, mirror surfaces formed on the vertical surfaces of the first grooves, and a second transparent resin having a refractive index equal or approximate to a refractive index of the first transparent resin and filled in the first grooves, and the second optical control portion includes a large number of second grooves triangular in section disposed parallel to each other on the other side of the transparent plate member, and each having an inclined surface and a vertical surface, a large number of second ridges triangular in section formed by the second grooves adjacent to each other, mirror surfaces formed on the vertical surfaces of the second grooves, and a second transparent resin having a refractive index equal or approximate to a refractive index of the first transparent resin and filled in the second grooves.

The first and second optical control portions are disposed so that the vertical surfaces of the first and second grooves are orthogonal to each other in a plan view, and the inclined surfaces of the first and second grooves are preferably formed of a) flat surfaces or b) concave surfaces, uneven surfaces, or polygonal surfaces recessed from the flat surfaces, however, the inclined surfaces may have a few convex portions.

In the stereoscopic image forming devices according to the fourth to sixth aspects of the present invention, the refractive index η2 of the second transparent resin is preferably in a range of 0.8 to 1.2 times (more preferably, 0.9 to 1.1 times, still more preferably, 0.96 to 1.04 times) as large as the refractive index η1 of the first transparent resin.

Advantageous Effects of Invention

In the methods for manufacturing a stereoscopic image forming device according to the first to third aspects of the present invention, a molding base material manufactured by any one of press molding, injection molding, and roll molding is used, and on the molding base material, a large number of grooves each having an inclined surface and a vertical surface are formed parallel to each other. These grooves become wider toward the open side, so that molding or demolding becomes easy, and a stereoscopic image forming device with a high aspect ratio defined as (groove depth)/(groove width) can be manufactured at a comparatively low cost.

In addition, the grooves of the intermediate base material are filled with the second transparent resin having a lower melting point than a lower melting point of the first transparent resin, so that the grooves can be filled while the shape of the first transparent resin is maintained.

The inclined surfaces of the grooves are formed of a) flat surfaces or b) concave surfaces, uneven (marked) surfaces, or polygonal surfaces respectively formed at positions recessed from the flat surfaces, so that band-shaped light reflecting surfaces formed of mirror surfaces can be easily formed on the vertical surfaces.

When minute concavities and convexities (for example, matte-finished) are formed on the inclined surfaces, adhesion to the second transparent resin can be improved, and the grooves can be filled with the second transparent resin without a space. As a result, light scattering at an interface between the inclined surface and the second transparent resin can be prevented, and since refractive indexes of the first transparent resin and the second transparent resin are equal or approximate to each other, influences of refraction at the interface can be minimized, and a high-quality stereoscopic image forming device capable of obtaining a bright and clear stereoscopic image with less distortion can be manufactured.

In a case where the inclined surfaces of the grooves are formed of concave surfaces, uneven surfaces, or polygonal surfaces formed at positions recessed from flat surfaces, or in a case where horizontal surfaces are formed between lower ends of the vertical surfaces and lower ends of the inclined surfaces of the grooves, when sputtering, metal deposition, spraying of metal microparticles, or irradiation of ion beams is performed for selective formation of mirror surfaces on the vertical surfaces, formation of mirror surfaces on the inclined surfaces can be effectively prevented.

In the stereoscopic image forming devices according to the fourth to sixth aspects of the present invention, grooves of a molding base material molded from the first transparent resin are filled with a second transparent resin having a refractive index equal or approximate to a refractive index of the first transparent resin, and accordingly, influences of refraction at the inclined surfaces are reduced, and a clear stereoscopic image can be obtained. In particular, when the refractive index η2 of the second transparent resin is in a range of 0.8 to 1.2 times as large as the refractive index η1 of the first transparent resin, a stereoscopic image with less distortion and less rainbow can be reproduced.

BRIEF DESCRIPTION OF DRAWINGS

FIG. 1(A) and FIG. 1(B) are respectively a front sectional view and a side sectional view of a stereoscopic image forming device manufactured by a method for manufacturing a stereoscopic image forming device according to a first embodiment of the present invention.

FIG. 2(A) and FIG. 2(B) are respectively a front sectional view and a side sectional view showing the same manufacturing method.

DESCRIPTION OF EMBODIMENTS

Next, methods for manufacturing a stereoscopic image forming device according to embodiments of the present invention, and stereoscopic image forming devices manufactured by using the methods, will be described with reference to the drawings.

As shown in FIG. 1(A) and FIG. 1(B), a stereoscopic image forming device 10 manufactured by a method for manufacturing a stereoscopic image forming device according to a first embodiment of the present invention is formed by superposing first and second optical control panels 13 and 14 respectively including large numbers of band-shaped light reflecting surfaces 11 and 12 disposed parallel to each other with spaces in standing states so that the band-shaped reflecting surfaces 11 and 12 are orthogonal to each other in a plan view.

Figure 4A:
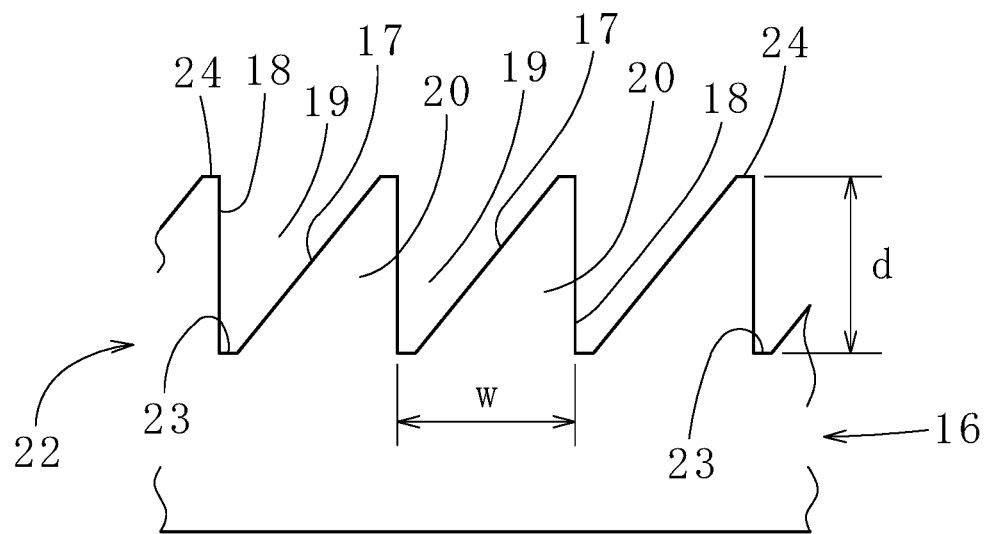
FIG. 4(A) and FIG. 4(B) are explanatory views of the method for manufacturing a stereoscopic image forming device according to the first embodiment of the present invention.

In order to manufacture this stereoscopic image forming device 10, as shown in FIG. 4(A), a molding base material 22 of the first or second optical control panel 13, 14 in which a large number of grooves 19 triangular in section each having an inclined surface 17 and a vertical surface 18, and a large number of ridges 20 triangular in section formed by the grooves 19 adjacent to each other, are disposed parallel to each other at predetermined pitches w at a front surface side (one side) of a transparent plate member 16, is manufactured by injection molding (or press molding or roll molding) by using a first transparent resin as a material. As this first transparent resin, a thermoplastic resin whose melting point is comparatively high (for example, ZEONEX (registered trademark, glass-transition temperature: 120 to 160° C., refractive index η1: 1.535, cycloolefin polymer)) is preferably used. Other than this, as the transparent resin, a thermoplastic resin such as polymethyl methacrylate (acrylic resin), amorphous fluorine resin, PMMA, optical polycarbonate, fluorene-based polyester, polyether sulfone can be used, and in particular, a material with a high melting point and high transparency is preferably used.

Figure 4B:
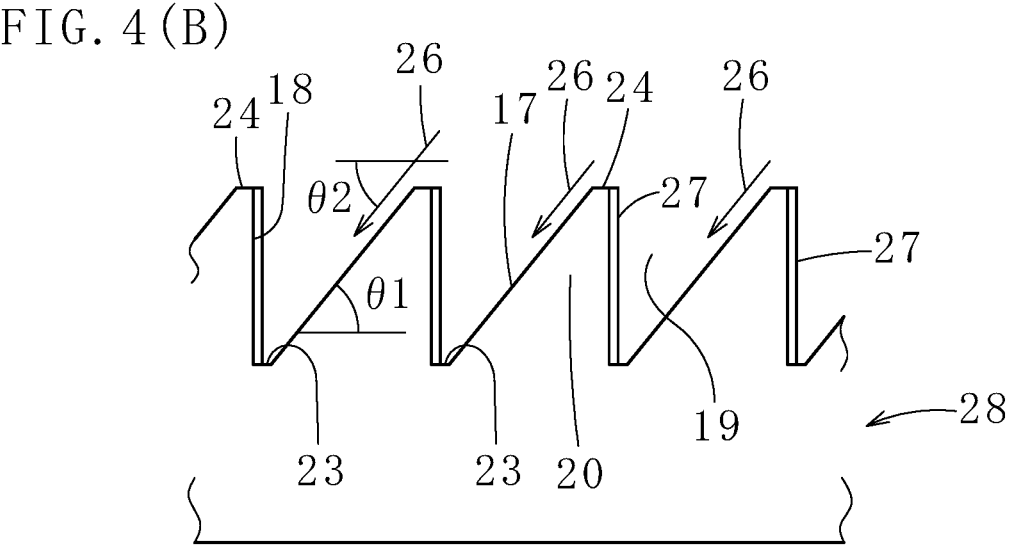

It is preferable that, after molding of the molding base material 22, annealing is applied to remove residual stresses, etc. As shown in FIG. 4(A) and FIG. 4(B), between a lower end of the inclined surface 17 and a lower end of the vertical surface 18 of the groove 19 and between an upper end of the inclined surface 17 and an upper end of the vertical surface 18 of the groove 19, horizontal surfaces 23 and 24 are respectively formed. It is preferable that the widths of the horizontal surface 23 and 24 are set to, for example, 0.01 to 0.1 times as large as the pitch w of the ridges 20. By forming these horizontal surfaces 23 and 24, shape stability of the grooves 19 and the ridges 20 becomes excellent, and reliability of dimensional management also becomes excellent (the same applies to the following embodiments).

The depth d of the grooves 19 is preferably set to (0.8 to 0.5)w. Accordingly, light reflecting surfaces with an aspect ratio (height d of mirror surfaces/pitch w of mirror surfaces) of 0.8 to 5 can be obtained (these are the first process).

Next, as shown in FIG. 4(B), mirror surfaces are selectively formed only on the vertical surfaces 18 of the grooves 19 of the molding base material 22, and the mirror surfaces are not formed on the inclined surfaces 17 but the inclined surfaces 17 are subjected to processing to maintain the transparent state. This mirror surface selective formation on the vertical surfaces 18 is performed by irradiating metal particles onto the vertical surfaces 18 in a vacuum state or under low pressure by sputtering, metal deposition, spraying of metal microparticles, irradiation of ion beams, or other methods, from diagonal directions along the inclined surfaces 17 in parallel to the inclined surfaces 17 or in a state where the inclined surfaces 17 are hidden behind the ridges 20. In this case, the metal particle irradiation direction 26 (angle θ2) is preferably laid at an angle within a narrow range (for example, 0.2 to 5 degrees) and smaller than an angle θ1 of the inclined surfaces 17 (that is, θ1>θ2). At this time, between the lower ends of the inclined surfaces 17 and the lower ends of the vertical surfaces 18 of the grooves 19, the horizontal surfaces 23 with a minute width (for example, 0.05 to 0.2 times as large as w) are formed, so that metal particles can be irradiated onto the lower ends of the vertical surfaces 18 without unevenness while adhesion of the metal particles to the inclined surfaces 17 is reduced or eliminated.

By the processes described above, only the vertical surfaces 18 are mirror-finished and vertical light reflecting surfaces 17 (that become band-shaped light reflecting surfaces 11, 12 of the first or second optical control panels 13, 14) are formed, and the intermediate base material 28 of the first or second optical control panel 13, 14 is manufactured (these are the second process). This selective mirror surface formation is performed in the same manner in other embodiments as well.

Figure 5A:
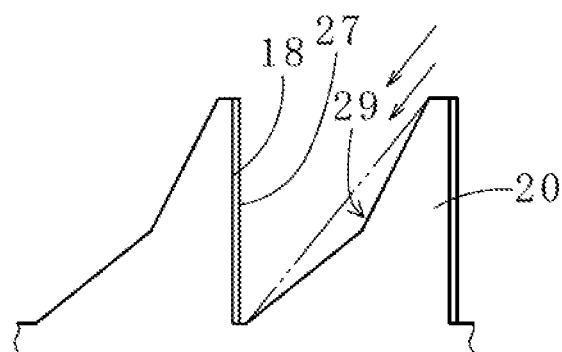
FIG. 5(A), FIG. 5(B), FIG. 5(C), and FIG. 5(D) are respectively partially enlarged side sectional views of grooves and ridges of an intermediate base material according to a modification of the same manufacturing method.
Figure 5B:
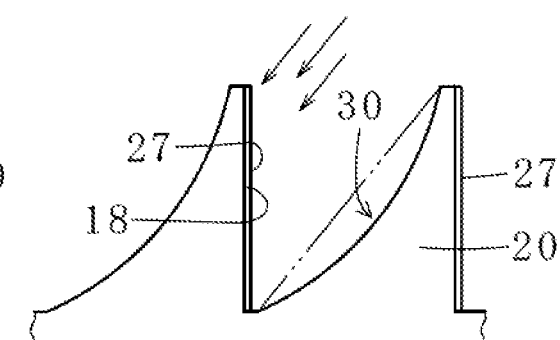
Figure 5C:
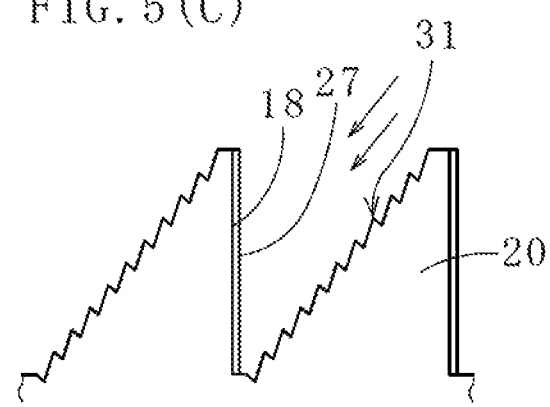
Figure 5D:
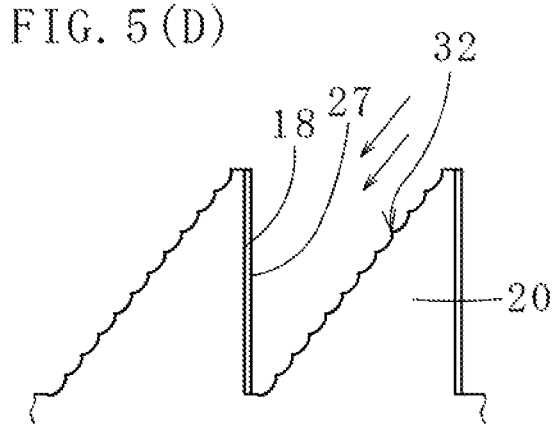

In this embodiment, the inclined surfaces 17 of the grooves 19 of the molding base material 22 are flat surfaces, so that metal particles may adhere to the inclined surfaces 17 as well during mirror-finishing of the vertical surfaces 18 although the adhesion is in a small range. Therefore, as shown in FIG. 5(A) and FIG. 5(B), it is also possible that inclined surfaces 29, 30 having polygonal surfaces or arc-shaped concave surfaces formed at positions recessed from the flat surfaces are formed. In addition, as shown in FIG. 5(C) and FIG. 5(D), it is also possible that inclined surfaces 31, 32 having uneven surfaces formed of numerous minute concavities and convexities (marks) are formed. In this case as well, the uneven surfaces are also formed to be recessed from the flat surfaces. Molding and demolding of the inclined surfaces 29, 30, 31, and 32 having polygonal surfaces, concave surfaces, or uneven surfaces recessed to the insides of the ridges 20 as described above are easy, and metal particles can be effectively prevented from adhering to the inclined surfaces 29, 30, 31, and 32 during mirror-finishing of the vertical surfaces 18. The uneven surfaces each formed of numerous minute concavities and convexities can be easily formed by forming in advance numerous minute concavities and convexities on front surfaces of a mold portions for forming the inclined surfaces 31 or 32 by shot-blasting or matte finishing, etc., at the time of manufacturing of a mold to be used for molding of the molding base material 22, and transferring the minute concavities and convexities onto the front surface of a first transparent resin that becomes the molding base material 22 at the time of molding. A shape of a concave portion of the concavities and convexities is not limited to the polygonal surface or the spherical surface shown in FIG. 5(C) and FIG. 5(D), and can be selected as appropriate. The concavities and convexities (marks) may be regularly formed or irregularly formed, however, the irregular formation further improves the anchoring effect. The size and roughness of the concave portion of the concavities and convexities can be selected as appropriate, however, the depth of the concave portion is set to 5 to 50 µm, and preferably, 10 to 30 µm. The concavities and convexities can be formed not only on front surfaces of the flat inclined surfaces but also on front surfaces of the inclined surfaces 29 and 30 having the polygonal surfaces or the concave surfaces shown in FIG. 5(A) and FIG. 5(B) in a combined manner.

The inclined surfaces having the polygonal surfaces, the concave surfaces, or the uneven surfaces described above can also be employed in the same manner in other embodiments as well. Inclined surfaces described as flat surfaces in drawings described below shall also include polygonal surfaces, concave surfaces, or uneven surfaces other than the flat surfaces.

By the processes described above, as shown in FIG. 2(A) and FIG. 2(B), the intermediate base materials 28 of the first and second optical control panels 13 and 14 are formed, so that in a state where the ridges 20 of intermediate base materials 28 to be paired are made to face each other so that the vertical surfaces 18 of the intermediate base materials 28 are orthogonal to each other in a plan view, the intermediate base materials are made to sandwich a sheet 33 of a second transparent resin with a lower melting point than a lower melting point of the first transparent resin and a refractive index equal or approximate to a refractive index of the first transparent resin (the same applies to the following embodiments), heated and pressed by flat presses with flat surfaces disposed parallel to melt only the second transparent resin in a vacuum state, and the grooves 19 of the respective intermediate base materials 28 facing each other are filled with the second transparent resin to join and integrate the intermediate base materials 28 together (these are the third process).

At this time, the horizontal surfaces 23 are present at the bottom portions of the grooves 19, so that air bubbles easily escape, and the molten second transparent resin can be completely filled in the grooves 19. In addition, the horizontal surfaces 24 are present at the top portions of the ridges 20, so that the top portions can be prevented from chipping or deforming, and the sheet 33 of the second transparent resin can be brought into contact with the horizontal surfaces 24 and reliably pressurized, and the second resin material can be made to closely adhere to the horizontal surfaces 24.

Here, when the depth of the grooves 19 is d, a thickness t1 of the sheet 33 of the second transparent resin is t1>d (more specifically, 2d>t1>d). By making the sheet 33 thicker than a predetermined value, the grooves 19 can be completely filled with the second transparent resin. At this time, when the inclined surface of the groove 19 includes a concave surface, an uneven surface, or a polygonal surface, adhesion between the inclined surface and the second transparent resin filled in the groove 19 can be increased, and the groove 19 can be filled with the second transparent resin without a space. In particular, when numerous concavities and convexities are formed on the inclined surface, the anchoring effect can be improved. In addition, since the second transparent resin has a refractive index equal or approximate to a refractive index of the first transparent resin, even when the inclined surface has a concave surface, an uneven surface, or a polygonal surface, the inclined surface can allow light to pass through without causing diffused reflection at the interface with the second transparent resin, and refraction can be minimized. If the amount of the resin in the groove 19 is insufficient, a space is formed, so that it is preferable that the thickness t1 of the sheet 33 is set so that the second transparent resin overflows from the grooves 19.

Figure 3A:
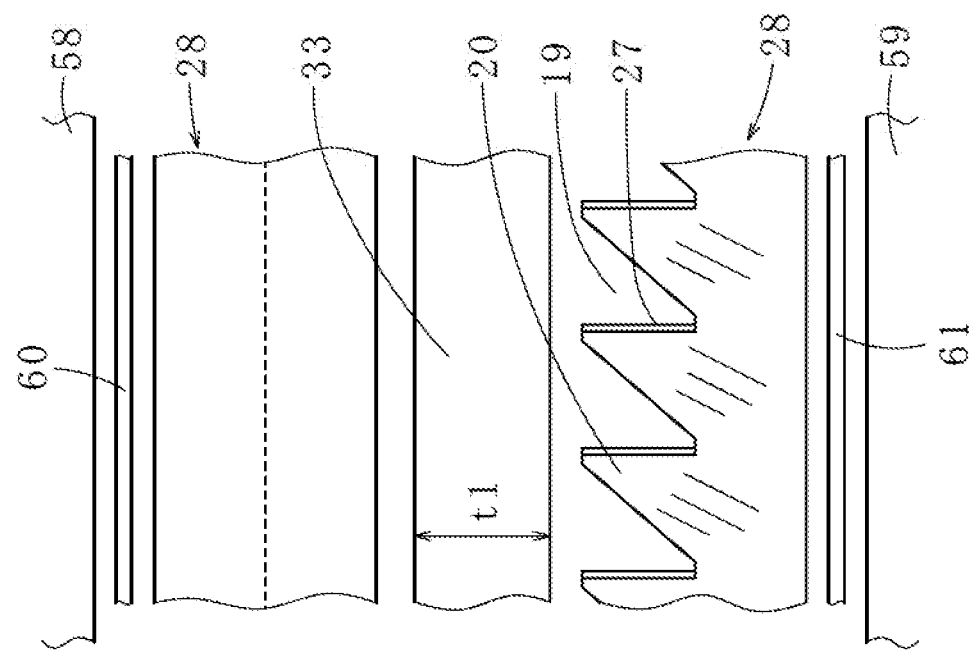
FIG. 3(A) and FIG. 3(B) are explanatory views of a modification of the same manufacturing method.
Figure 3B:
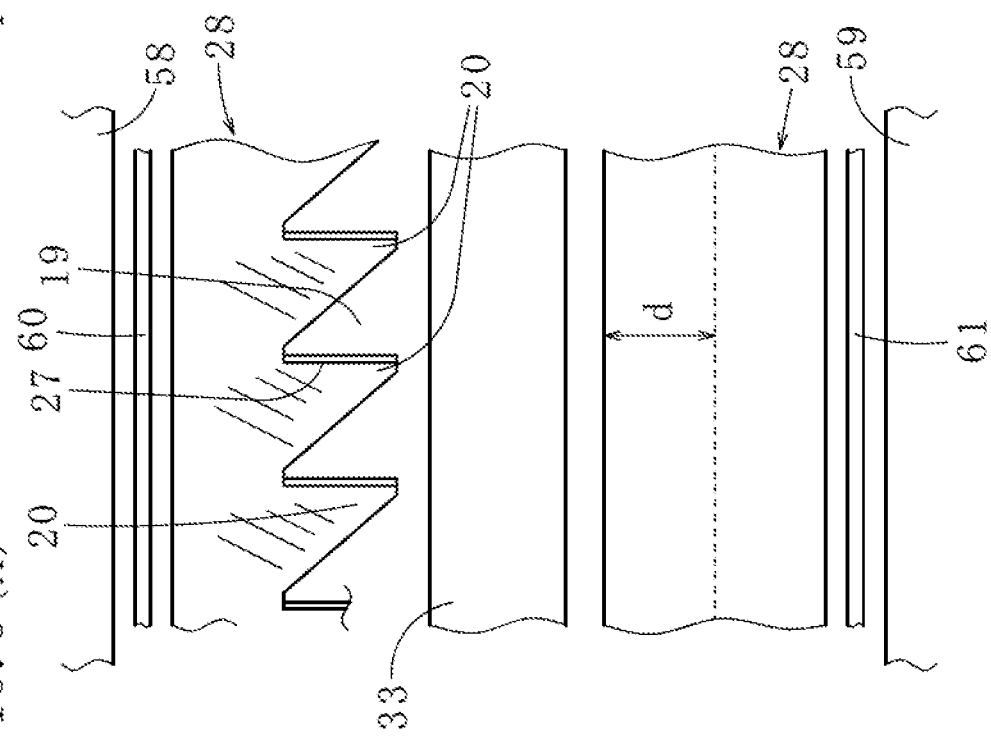

Here, as shown in FIG. 3(A) and FIG. 3(B), it is preferable that, between the flat presses (mold) 58 and 59 and the intermediate base materials 28, flat metal sheets 60 and 61 formed of stainless steel plates, copper plates, titanium plates, etc., are disposed. Accordingly, the front surfaces of the intermediate base materials 28 are not flawed, and heat conduction becomes uniform. Further, slight flaws on the front surfaces of the flat presses 58 and 59 are allowed, so that the life of the entire device can be lengthened. A thickness of the flat metal sheets 60 and 61 is, for example, approximately 0.5 to 5 mm.

By the processes described above, as shown in FIG. 1(A) and FIG. 1(B), the stereoscopic image forming device 10 in which the ridges 20 of the first and second optical panels 13 and 14 face each other is completed. The base portions (that is, the molding base materials 22) of the first and second optical control panels 13 and 14 are made of the first transparent resin, and their exposed surfaces 34 and 35 are completely flat surfaces.

As the second transparent resin, for example, ZEONOR (registered trademark, glass-transition temperature: 100 to 102° C., refractive index η2: 1.53, cycloolefin polymer) is preferably used, however, instead of this, other transparent resins can be used as long as the resins have lower melting points and higher transparency than those of the first transparent resin, and have a refractive index equal or approximate to a refractive index of the first transparent resin.

Operation of this stereoscopic image forming device 10 will be described with reference to FIG. 1(A) and FIG. 1(B). Light L1 from an object not illustrated enters the second optical control panel 14 at P1, and is reflected at P2 by the band-shaped light reflecting surface 12 (formed of the vertical light reflecting surface 27) of the second optical control panel 14, enters the first optical control panel 13, and is reflected at P3 by the band-shaped light reflecting surface 11 (formed of the vertical light reflecting surface 27) of the first optical control panel 13, and exits at the position of P4 from the first optical control panel 13 into the air and forms an image. Here, light enters the second transparent resin from the first transparent resin at Q1 in FIG. 1(A), and enters the first transparent resin from the second transparent resin at Q2, and the refractive indexes of the first and second transparent resins are substantially the same, so that a phenomenon such as total reflection does not occur. In addition, at S1 and S2 in FIG. 1(B), light passes through different substances, however, refractive indexes of the substances are approximate to each other, so that total reflection, etc., does not occur.

Refraction occurs at the positions of P1 and P4 as well, however, refractions at P1 and P4 are offset.

Figure 6:
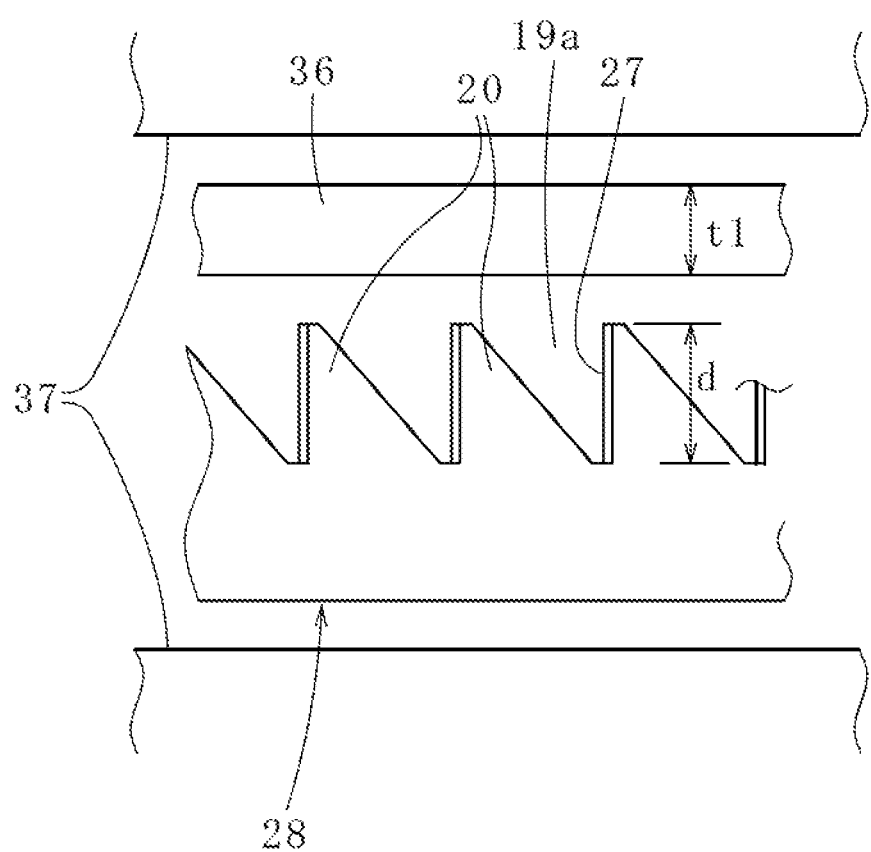
FIG. 6 is an explanatory view of a method for manufacturing a stereoscopic image forming device according to a second embodiment of the present invention.

Next, a method for manufacturing a stereoscopic image forming device according to a second embodiment of the present invention will be described with reference to FIG. 6.

First, in the same manner as in the method for manufacturing a stereoscopic image forming device according to the first embodiment, an intermediate base material 28 of the first optical control panel 13 is manufactured by the first process and the second process shown in FIG. 4(A) and FIG. 4(B). Then, as shown in FIG. 6, this intermediate base material 28 and a sheet 36 which is made of the second transparent resin are superposed, and disposed between flat surfaces of flat presses 37 with a heating mechanism. In this case, the ridges 20 of the intermediate base material 28 are brought into contact with the sheet 36. The thickness t1 of the sheet 36 must be set so that the sheet 36 completely fills the insides of the grooves 19a when the sheet 36 is molten, and this thickness t1 of the sheet 36 will be described later.

Figure 7A:
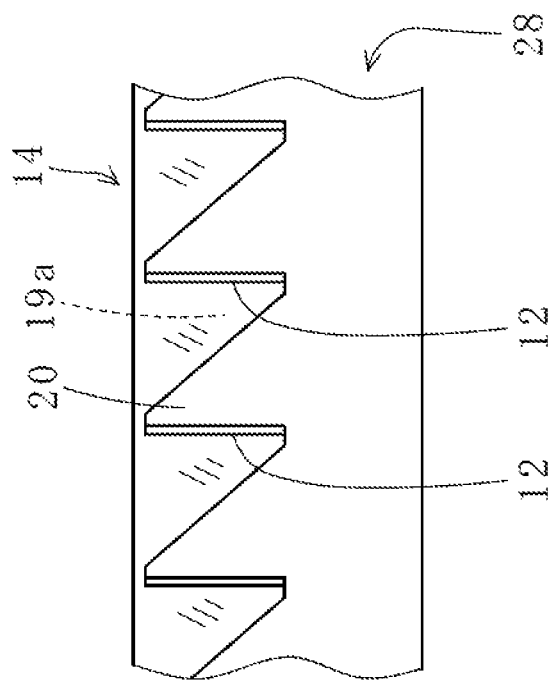
FIG. 7(A) and FIG. 7(B) are respectively explanatory views of first and second optical control panels manufactured by the same manufacturing method.
Figure 7B:
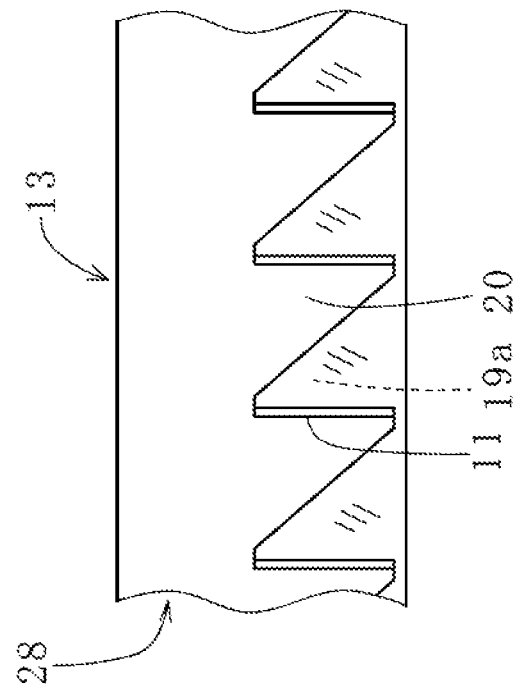

Next, in a vacuum state, by performing heating and pressing to a temperature that melts the second transparent resin but does not melt the first transparent resin, the grooves 19a are completely filled with the second transparent resin, and then, cooling is performed, and accordingly, the first optical control panel 13 shown in FIG. 7(A) is obtained. In addition, the second control panel 14 shown in FIG. 7(B) is manufactured in the same manner (these are the third process). Then, the first and second optical control panels 13 and 14 are superposed so that the vertical light reflecting surfaces 27 forming the band-shaped light reflecting surfaces 11 of the first optical control panel 13 and the vertical light reflecting surfaces 27 forming the band-shaped light reflecting surfaces 12 of the second optical control panel 14 are orthogonal to each other (in a range of 88 to 92 degrees) in a plan view, and sealed (for example, in a vacuum state) and joined together by using a transparent resin (for example, an ultraviolet-curing resin), etc.

When joining the first and second optical control panels 13 and 14 together, there are cases where they are superposed so that the front surface sides on which the ridges 20 are formed come into contact with each other, the front surface side and the back surface side of the first and second optical control panels 13 and 14 come into contact with each other, and the back surface sides of the first and second optical control panels 13 and 14 come into contact with each other.

Figure 8:
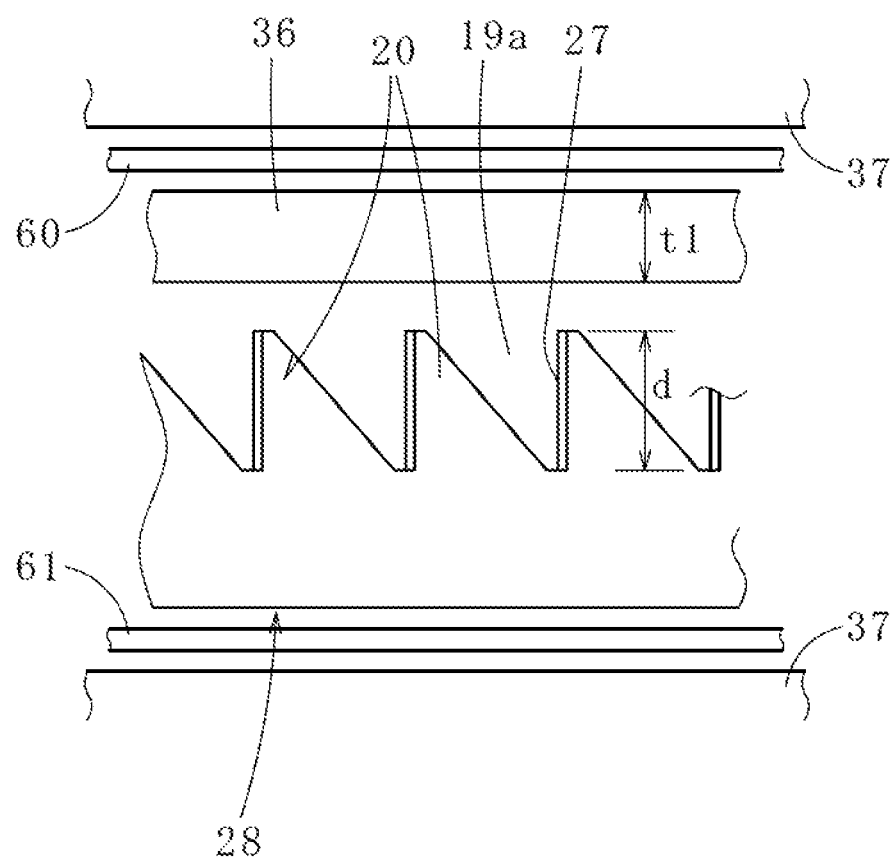
FIG. 8 is an explanatory view of a modification obtained by partially improving the same manufacturing method.

As shown in FIG. 8, it is preferable that the first and second optical control panels 13 and 14 are manufactured by disposing flat metal sheets 60 and 61 formed of stainless steel plates, copper plates, titanium plates, etc., between the lower flat press 37 and the intermediate base material 28 and between the upper flat press 37 and the sheet 36 which is made of the second transparent resin. Accordingly, the front surfaces of the intermediate base material 28 are not flawed, and heat conduction becomes uniform. Further, slight flaws on the front surfaces of the flat presses 37 are allowed, so that the life of the entire device can be lengthened.

In the method shown in FIG. 7 and FIG. 8, the first and second optical control panels 13 and 14 are manufactured separately, however, it is also possible that, in a state where sheets 36 made of the second transparent resin and having a predetermined thickness are respectively superimposed on the grooves 19a of the first and second control panels 13 and 14, they are placed on the flat press 37, and heated and pressed in a vacuum state.

A method for manufacturing a stereoscopic image forming device according to a third embodiment of the present invention shown in FIG. 9(A) and FIG. 9(B) will be described. First, a molding base material 50 in which, on both sides of a transparent plate member 40 made of a first transparent resin, large numbers of first and second grooves 45 and 46 triangular in section, each having an inclined surface 41, 42 and a vertical surface 43, 44, and large numbers of first and second ridges 47 and 48 triangular in section formed by the first grooves 45, 46 adjacent to each other, are respectively formed so that the vertical surfaces 43 and 44 of the first and second grooves 45 and 46 respectively formed on both sides of the transparent plate member 40 are orthogonal to (interact) each other in a plan view, is manufactured by press molding, injection molding, or roll molding (these are the first process). In this embodiment, the inclined surfaces 41 and 42 of the first and second grooves 45 and 46 are formed to have concave surfaces recessed in arc shapes to the insides of the second ridges 47 and 48, however, as described in the first embodiment, the inclined surfaces may be flat surfaces, or shaped to have polygonal surfaces or uneven surfaces.

Next, only the vertical surfaces 43 and 44 are subjected to mirror-finishing in the same manner as in the procedures described in the method for forming a stereoscopic image forming device according to the first embodiment (refer to FIG. 4(B)). Accordingly, the vertical light reflecting surfaces 51 and 52 that function as band-shaped light reflecting surfaces of the first and second optical control portions are formed, and an intermediate base material 53 is formed (these are the second process).

Figure 9A:
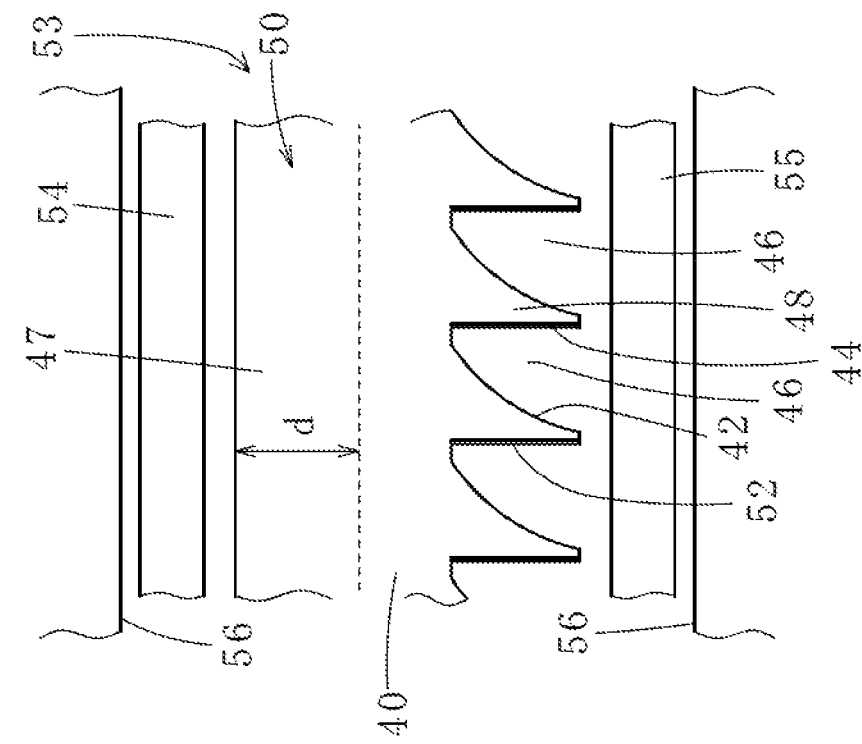
FIG. 9(A) and FIG. 9(B) are respectively explanatory views of a method for manufacturing a stereoscopic image forming device according to a third embodiment of the present invention.
Figure 9B:
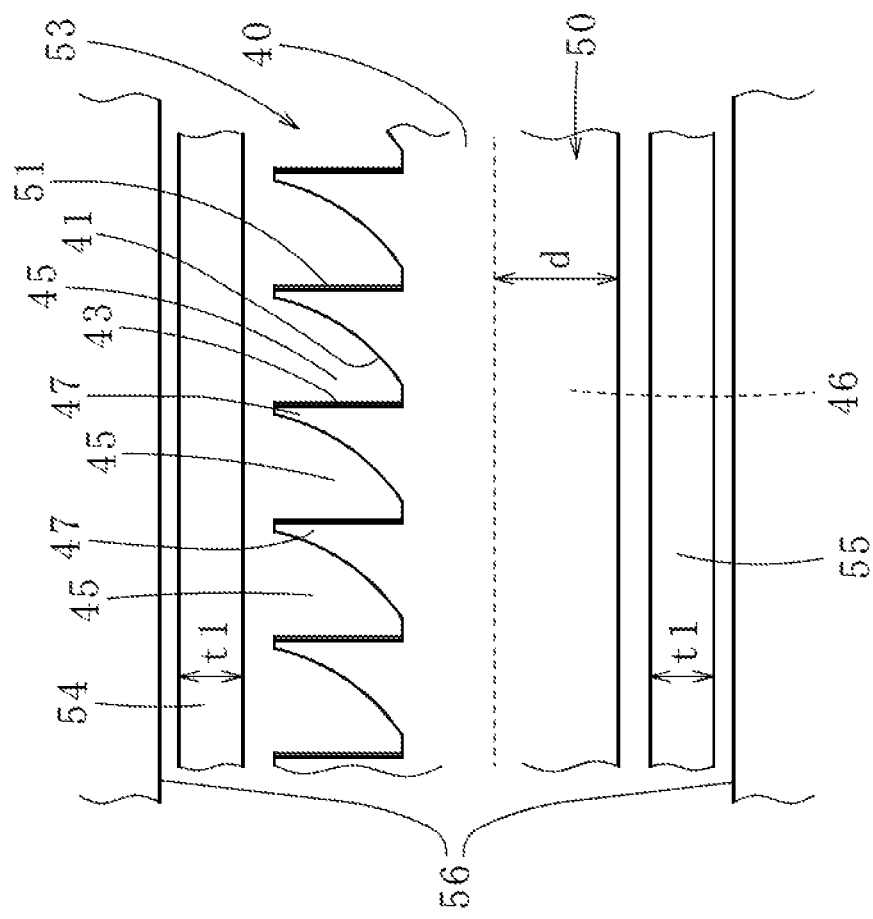

Then, as shown in FIG. 9(A) and FIG. 9(B), on the upper and lower sides of this intermediate base material 53, sheets 54 and 55 made of the second transparent resin are disposed and sandwiched between flat presses 56, and pressed while being heated in a state where the surrounding is vacuated (specifically, put into a vacuum heating furnace). Accordingly, although the first transparent resin does not melt, the second transparent resin melts and fluidifies, and completely fills the first and second grooves 45 and 46, and accordingly, first and second optical control portions are formed (these are the third process).

As a result, the upper and lower surfaces become completely flat surfaces, and a stereoscopic image forming device in which first and second optical control portions that respectively include band-shaped light reflecting surfaces orthogonal to each other in a plan view are formed on the front and back surfaces and integrated, is completed. The materials of the first transparent resin and the second transparent resin are the same as in the method for manufacturing a stereoscopic image forming device according to the first embodiment.

In this embodiment, it is also possible that, between the upper flat press 56 and the sheet 54 and between the lower flat press 56 and the sheet 55, the above-described flat metal sheets are disposed to further improve the quality of the optical control panel.

In the methods for manufacturing a stereoscopic image forming device according to the embodiments described above, when the depth of the grooves 19a, 45, 46 is d, the thickness t1 of the sheets 36, 54, and 55 of the second transparent resin is preferably 2×t1>d (more specifically, 2d>2×t1>d). Accordingly, the grooves 19a, 45, and 46 can be reliably filled with the heated and fluidified second transparent resin.

In the methods for manufacturing a stereoscopic image forming device according to the first to third embodiments, the refractive index $\eta 2$ of the second transparent resin is preferably in a range of 0.8 to 1.2 times (more preferably, 0.9 to 1.1 times) as large as the refractive index $\eta 1$ of the first transparent resin, however, it is not limited to this refractive index in the present invention.

In the second embodiment, as in the first embodiment, the first and second optical control panels 13 and 14 are formed by molding the molding base materials of the first and second optical control panels 13 and 14 from first transparent resins with the same refractive index $\eta 1$, and filling the respective grooves 19a with the second transparent resin with the refractive index $\eta 2$ approximate to the refractive index of the first transparent resin, however, the first transparent resin to be used to manufacture the molding base materials of the first and second optical control panels 13 and 14 and the second transparent resin to be filled in the respective grooves 19a do not necessarily have to be the same. For example, when the molding base material of the first optical control panel 13 is made of a first transparent resin with a refractive index $\eta 1$, and a second transparent resin with a refractive index $\eta 2$ approximate to the refractive index of the first transparent resin is filled in the grooves 19a, it is also possible that the second optical control panel 14 is manufactured from a first transparent resin with a refractive index $\eta 3$, and the grooves 19a is filled with a second transparent resin with a refractive index $\eta 4$ approximate to the refractive index $\eta 3$ of the first transparent resin. In this case as well, it is also preferable that the refractive index $\eta 3$ is in a range of 0.8 to 1.2 times (more preferably, 0.9 to 1.1 times) as large as the refractive index $\eta 1$, and the refractive index $\eta 4$ is in a range of 0.8 to 1.2 times (more preferably, 0.9 to 1.1 times) as large as the refractive index $\eta 3$, however, they are not limited to these refractive indexes, and the refractive indexes may be properly selected and used in combination in a range enabling formation of a stereoscopic image.

The present invention is not limited to the embodiments described above, and the present invention is also applied to a case where a stereoscopic image forming device is configured or manufactured by combining components of the stereoscopic image forming devices or the manufacturing methods according to the respective embodiments. In the embodiments described above, the vertical light reflecting surfaces (mirror surfaces) serving as band-shaped light reflecting surfaces are formed on both sides of a metal coating formed by mirror finishing on the vertical surfaces of the grooves.

In the present invention described above, a light incidence plane and a light exit plane must be completely flat or substantially completely flat, and flattening of these planes includes pressing with presses, etc., molding with a mold, and formation by cutting or polishing.

INDUSTRIAL APPLICABILITY

A stereoscopic image forming device obtained by combining first and second optical control panels or a stereoscopic image forming device including first and second optical control portions on both sides can be manufactured at a comparatively low cost, and stereoscopic image viewing in the field of video images can become more widespread.

REFERENCE SIGNS LIST

10: Stereoscopic image forming device, 11, 12: Band-shaped light reflecting surface, 13: First optical control panel, 14: Second optical control panel, 16: Transparent plate member, 17: Inclined surface, 18: Vertical surface, 19, 19a: Groove, 20: Ridge, 22: Molding base material, 23, 24: Horizontal surface, 26: Irradiation direction, 27: Vertical light reflecting surface (band-shaped light reflecting surface), 28: Intermediate base material, 29, 30, 31, 32: Inclined surface, 33: Sheet, 34, 35: Exposed surface, 36: Sheet, 37: Flat press, 40: Transparent plate member, 41, 42: Inclined surface, 43, 44: Vertical surface, 45, 46: Groove, 47, 48: Ridge, 50: Molding base material, 51, 52: Vertical light reflecting surface (band-shaped light reflecting surface), 53: Intermediate base material, 54, 55: Sheet, 56: Flat press, 58, 59: Flat press, 60, 61: Flat metal sheet

The invention claimed is:

1. A method for manufacturing a stereoscopic image forming device in which first and second optical control panels each including a number of band-shaped light reflecting surfaces disposed parallel to each other with spaces in standing states are set so that the band-shaped light reflecting surfaces of the first and second optical control panels are orthogonal to each other in a plan view, and superposed, comprising:
a first process of manufacturing, by any one of press molding, injection molding, and roll molding, from a first transparent resin, molding base materials of the first and second optical control panels in each of which a number of grooves triangular in section each having an inclined surface and a vertical surface, and a number of ridges triangular in section formed by the grooves adjacent to each other, are disposed parallel to each other on one side of a transparent plate member;
a second process of manufacturing intermediate base materials of the first and second optical control panels by selectively forming mirror surfaces only on the vertical surfaces of the grooves of each of the molding base materials; and
a third process of joining and integrating together the intermediate base materials by filling in the grooves a molten second transparent resin with a lower melting point than a lower melting point of the first transparent resin and a refractive index $\eta 2$ in a range of 0.9 to 1.1 times as large as a refractive index $\eta 1$ of the first transparent resin in a state where the intermediate base materials are made to face each other so that the vertical surfaces of the grooves are orthogonal to each other in a plan view, wherein
the inclined surfaces of the grooves of the respective molding base materials manufactured in the first process are formed of a) flat surfaces or b) concave surfaces, uneven surfaces, or polygonal surfaces recessed from the flat surfaces.

2. The method for manufacturing a stereoscopic image forming device according to claim 1, wherein the selective formation of mirror surfaces on the vertical surfaces of the grooves in the second process is performed by sputtering, metal deposition, spraying of metal microparticles, or irradiation of ion beams onto the vertical surfaces from diagonal directions so that the inclined surfaces of the grooves are hidden behind the ridges.

3. A method for manufacturing a stereoscopic image forming device in which first and second optical control panels each including a number of band-shaped light reflecting surfaces disposed parallel to each other with spaces in standing states are set so that the band-shaped light reflecting surfaces of the first and second optical control panels are orthogonal to each other in a plan view, and superposed and joined together, wherein
the first and second optical control panels are respectively manufactured by:
a first process of manufacturing, by any one of press molding, injection molding, or roll molding from a first transparent resin, molding base materials of the first and second optical control panels in each of which a number of grooves triangular in section each having an inclined surface and a vertical surface, and a number of ridges triangular in section formed by the grooves adjacent to each other, are respectively formed parallel to each other on one side of a transparent plate member;
a second process of forming intermediate base materials of the first and second optical control panels by selectively forming mirror surfaces only on the vertical surfaces of the grooves of the respective molding base materials; and
a third process of filling in the grooves of each of the intermediate base materials a molten second transparent resin with a lower melting point than a lower melting point of the first transparent resin and a refractive index $\eta 2$ in a range of 0.9 to 1.1 times as large as a refractive index $\eta 1$ of the first transparent resin, wherein
the inclined surfaces of the grooves of the respective molding base materials manufactured in the first process are formed of a) flat surfaces or b) concave surfaces, uneven surfaces, or polygonal surfaces recessed from the flat surfaces.

4. The method for manufacturing a stereoscopic image forming device according to claim 3, wherein the selective formation of mirror surfaces on the vertical surfaces of the grooves in the second process is performed by sputtering, metal deposition, spraying of metal microparticles, or irradiation of ion beams onto the vertical surfaces from diagonal directions so that the inclined surfaces of the grooves are hidden behind the ridges.

5. A stereoscopic image forming device in which first and second optical control panels each including a number of band-shaped light reflecting surfaces disposed parallel to each other with spaces in standing states are set so that the band-shaped light reflecting surfaces of the first and second optical control panels are orthogonal to each other in a plan view, and superposed and joined together, wherein
each of the first and second optical control panels includes a number of grooves triangular in section disposed parallel to each other on one side of a transparent plate member formed of a first transparent resin, and each having an inclined surface and a vertical surface, a number of ridges triangular in section formed by the grooves adjacent to each other, and mirror surfaces formed on the vertical surfaces of the grooves, the first and second optical control panels are disposed to face each other so that the vertical surfaces of the grooves are orthogonal to each other in a plan view, and joined and integrated together by a second transparent resin having a refractive index $\eta 2$ in a range of 0.9 to 1.1 times as large as a refractive index $\eta 1$ of the first transparent resin and filled in the grooves, and the inclined surfaces of the grooves are formed of a) flat surfaces or b) concave surfaces, uneven surfaces, or polygonal surfaces recessed from the flat surfaces.

\* \* \* \* \*